United States Patent [19]

Meyer et al.

[11] Patent Number: 5,107,198
[45] Date of Patent: Apr. 21, 1992

[54] APPARATUS FOR CHARGING A BATTERY ESPECIALLY A BATTERY IN A MOTOR VEHICLE, WITH A SELF-EXCITING GENERATOR

[75] Inventors: Friedhelm Meyer, Illingen; Wunnibald Frey, Schwieberdingen; Mathias Doege, Korntal-Münchingen, all of Fed. Rep. of Germany

[73] Assignee: Robert Bosch GmbH, Stuttgart, Fed. Rep. of Germany

[21] Appl. No.: 548,920

[22] PCT Filed: Sep. 20, 1989

[86] PCT No.: PCT/DE89/00596
§ 371 Date: Jul. 27, 1990
§ 102(e) Date: Jul. 27, 1990

[87] PCT Pub. No.: WO90/07218
PCT Pub. Date: Jun. 28, 1990

[30] Foreign Application Priority Data

Dec. 22, 1988 [DE] Fed. Rep. of Germany ....... 3843161

[51] Int. Cl.$^5$ .......................... H02J 7/16; F02N 11/04
[52] U.S. Cl. ......................................... 322/60; 322/28; 322/88
[58] Field of Search ............................. 322/28, 60, 88

[56] References Cited

U.S. PATENT DOCUMENTS

| | | | |
|---|---|---|---|
| 2,393,012 | 1/1946 | Atwell | 322/28 |
| 3,568,041 | 3/1971 | Arakane | 322/60 X |
| 3,577,061 | 5/1971 | Wyles | 322/60 X |
| 3,585,490 | 6/1971 | Zelina | 322/60 X |
| 3,611,112 | 10/1971 | Lehinhoff | 322/60 X |
| 4,301,376 | 11/1981 | Ragaly | 322/88 X |

Primary Examiner—R. J. Hickey
Attorney, Agent, or Firm—Michael J. Striker

[57] ABSTRACT

The apparatus for charging a battery particularly for a motor vehicle, with a self-exciting generator is provided in which the generator pre-excitation is improved during starting in that an additional relay is triggered via the starter arrangement, which relay connects the battery with the exciting winding via an additional line when starting and improves the pre-excitation. The additional relay contains a delay circuit, so that the pre-excitation is improved via the additional line also some time after the starting process. The additional line or current branch can contain the relay switch of the additional relay, a resistor and a diode connected electrically in series and the battery is connected with the exciting winding of the generator by it when the additional relay is energized. A capacitor can be connected in parallel with the additional relay coil to provide an appropriate time delay.

11 Claims, 1 Drawing Sheet

APPARATUS FOR CHARGING A BATTERY ESPECIALLY A BATTERY IN A MOTOR VEHICLE, WITH A SELF-EXCITING GENERATOR

BACKGROUND OF THE INVENTION

The present invention relates to an apparatus for charging a battery with a self-exciting generator and, more particularly, to an apparatus for charging a battery of a motor vehicle with a self-exciting generator having a more efficient pre-excitation of the self-exciting generator.

A known apparatus for charging a battery, particularly in a motor vehicle driven by an internal combustion engine, comprises a self-exciting generator having an exciting winding through which an exciting current can pass and a generator output, a regulator connected in series to the exciting winding of the generator for regulating the exciting current in the exciting winding; a starter arrangement including a starter motor for starting the internal combustion engine and a starter relay including a starter relay coil and a starter relay switch for switching on the starter motor; a battery having two terminals, one of the terminals being connected to ground together with the generator output and the other of the terminals being connected to a supply line; and an ignition/starter switch connected to the supply line, the ignition/starter switch having an initial position, an operating position and a starting position and also an operating contact and a starting contact and the ignition/starter switch being structured and electrically connected with the battery, with consuming devices and with the starter arrangement, so that no current flows through the ignition/starter switch in the initial position of the ignition/starter switch, current flows through the operating contact and the consuming devices when the ignition/starter switch is in the operating position and current flows through the starter arrangement including the starter motor and consuming devices when the ignition/starter switch is in the starting position; and a first current branch including the operating contact of the ignition/starter switch, the first current branch being connected to the exciting winding of the generator.

Generators which energize themselves after the motor driving them is started are used in motor vehicles. This self-excitation must be reliable in such a way that the power supply system can be supplied with power immediately after starting the motor of the generator. The magnetic remanence alone is normally not sufficient for ensuring the self-excitation. Therefore, the attempt is made to promote the self-excitation by various circuits and different levels of power expenditure. One of the customary possibilities for promoting the self-excitation is to use the charge control light simultaneously to pre-excite the generator. For this purpose, energy is supplied to the exciting winding from the battery via the charge control light when starting. In this case, the excitation of the generator is dependent on the charge state of the battery, on the battery voltage, the frequency of starting or attempts at starting, but particularly on the output value and the operativeness of the charge control light, and also on the connection value or wattage of the loads already connected to the generator and on the ambient temperature. Under the most unfavorable circumstances, the generator does not excite itself and the battery is not recharged.

Therefore, in order to improve the self-excitation, it is provided according to DE-OS 26 08 606 to supply the exciting winding with exciting power from the battery via the starter during the starting process by an additional connection via a resistor and a diode. But this possibility of supplying additional exciting power has the disadvantage that it is terminated immediately after the starting process has ended. To the extent that it has not been completely accomplished after the starting process, the excitation of the generator is therefore not effected in the desired manner in order to achieve the required generator output voltage as quickly and as reliably as possible.

SUMMARY OF THE INVENTION

The above-mentioned disadvantages will be removed according to the invention in an apparatus for charging a battery, particularly in a motor vehicle driven by an internal combustion engine, comprising a self-exciting generator having an exciting winding through which an exciting current can pass and a generator output, a regulator connected in series to the exciting winding of the generator for regulating the exciting current in the exciting winding; a starter arrangement including a starter motor for starting the internal combustion engine and a starter relay including a starter relay coil and a starter relay switch for switching on the starter motor; a battery having two terminals, one of the terminals being connected to ground together with the generator output and the other of the terminals being connected to a supply line; and an ignition/starter switch connected to the supply line, the ignition/starter switch having an initial position, an operating position and a starting position and also an operating contact and a starting contact and the ignition/starter switch being structured and electrically connected with the battery, with consuming devices and with the starter arrangement, so that no current flows through the ignition/starter switch in the initial position of the ignition/starter switch, current flows through the operating contact and the consuming devices when the ignition/starter switch is in the operating position and current flows through the starter arrangement including the starter motor and consuming devices when the ignition/starter switch is in the starting position/ and a first current branch including the operating contact of the ignition/starter switch, the first current branch being connected to the exciting winding of the generator.

According to the invention, the apparatus for charging also comprises an additional relay including an additional relay coil and additional relay switch and an additional current branch. The additional current branch includes the additional relay and electrically connects the battery and the exciting winding of the generator through the additional relay switch when the additional relay is actuated by current flowing through the additional relay coil.

Advantageously the apparatus also includes a capacitor connected in parallel to the additional relay so that the capacitor acts as a time delay means for the additional relay, and an additional diode having an anode and a cathode, the cathode of the additional diode being connected to the additional relay and the anode of the additional diode being connected to the starter relay coil and the ignition/starter switch. Other time delay means connected with the additional relay are possible within the scope of the invention.

In contrast to known apparatus, the battery charging apparatus of the invention, according to the invention, has the additional current branch including the additional relay. The additional current branch electrically connects the battery and the exciting winding by the additional relay when the additional relay is energized. This apparatus has the advantage that it also enables a reliable of the generator under unfavorable conditions. The generator is excited in every instance after starting, regardless of the state of the charge control light, regardless, to a great extent, of the voltage of the battery and the remanence remaining in the generator or the number of starting attempts.

Since the additional excitation is effected via an additional relay with a delay circuit, the additional excitation is not interrupted immediately after the end of the starting process.

It is advantageous e.g. to connect an ohmic resistor in the circuit of the auxiliary excitation, so that the auxiliary exciting current can accordingly be reduced or fixed in a defined manner during the starting process. Accordingly, fire damage to the collector rings, for example, can be avoided. In addition, it is advantageous that the duration of the auxiliary exciting current can be fixed by means of using a time function element which can be selected as desired.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE INVENTION

Figure 1:
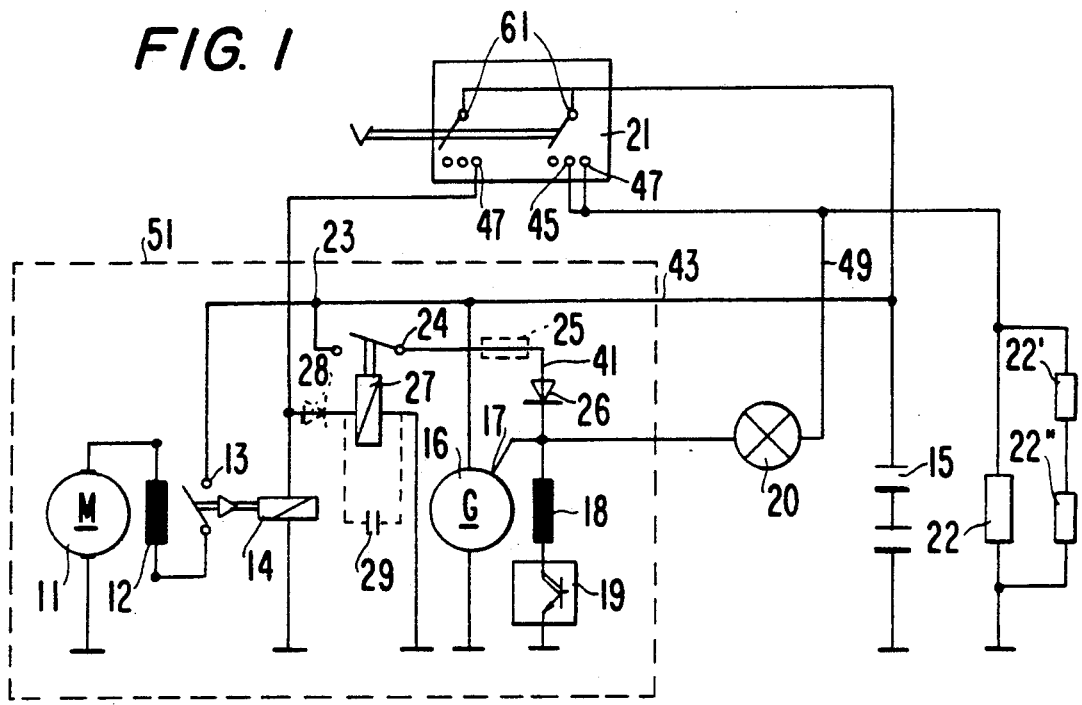
FIG. 1 is a schematic diagram of one embodiment of an arrangement for charging a battery according to our invention.

FIG. 1 shows the starter motor 11 with a field winding 12 connected in series. The starter relay switch 13 is connected in series with the armature of ,the starter motor 11 and the field winding 12. The starter relay switch 13 can be actuated with the aid of a starter relay coil 14. The starter switch 13 and the starter relay coil 14 together comprise a starter relay, which can be e.g. a trip relay. The free end of the armature of the, starter motor 11 is grounded, the free end of the starter relay switch 13 is connected to the positive terminal of a battery 15, according to the embodiment example. The negative terminal of the battery 15 is connected to ground. The bridge rectifier, not shown, of a generator 16 is connected between the positive terminal of the battery and ground. The generator 16 of the embodiment example is a generator with a subsequently connected series bridge, rectifier and subsequently connected exciting diodes. A separate output 17 of the generator is therefore provided for the exciting diodes. The generator 16 has an exciting winding 18, drawn separately, which is connected to ground on the one hand via a regulator 19 and is connected with the generator via an output 17 and with an output of the ignition/starter switch 21 via a charge control light 20 on the other hand. The respective input terminals 61 of the ignition/starter switch 21 is connected to the positive terminal of the battery 15. In addition, the charge control light 20 is connected with the power supply system 22. The power supply system supplies consuming devices 22' and 22", e.g., lights, heating devices, radio devices, etc. The starter relay 14 is connected between another output of the ignition/starter switch 21 and ground.

The ignition/starter switch 21 contains a plurality of internal contacts, including an operating contact 45 and starting contact 47. None of the contacts is closed in the initial position. The operating contact 45 for switching on consuming devices 22', 22" in the motor vehicle is closed in the operating position and a starting contact 47 for switching on the starter arrangement and the operating contact are closed in a starting position. A first current branch 49 leading to the exciting winding 18 is a part of the charging apparatus and the exciting winding is energized when the operating contact 47 is made or closed in the operating position.

An additional line or current branch 44 is connected to the supply line 43 between the battery 15 and the starter relay switch 13 at a point 23, including an additional relay switch 24 and possibly a resistor 25, and a diode 26 which is biased in the forward direction connected in series with the exciting winding 18, the generator output 17 and the charge control light 20. The additional current branch 41 also includes an additional relay 24, 27 including the additional relay switch 24 and an additional relay coil 27. The additional relay switch 24 is actuated by a relay coil 27 triggered by the starter arrangement 11-14. Moreover, according to the embodiment example according to FIG. 1, a additional diode 28 which prevents back effects on the starter relay 14 is connected between the starter relay 14 and the additional relay 27, wherein the cathode of the diode 28 is connected to the additional relay coil 27. The capacitor 29, together with the relay coil, forms a time delay element which enables the additional relay to be switched with a time delay.

After the actuation of the ignition/starter switch 21, by making the starting contact 47 the starter relay coil 14 closes the starter relay switch 13. Accordingly, current flows from the battery via the switch 13 and the field winding 12 of the starter motor. The additional relay switch 24 is closed via the relay coil 27 energized by the ignition/starter switch 21 or by the starter arrangement 11-14, so that an additional exciting current flows from the battery 15 via the switch 24, the resistor 25 and the diode 26 through the exciting winding 18 of the generator and the voltage regulator 19 to ground. This current causes an additional pre-excitation of the generator during the starting process. In order to lengthen the pre-excitation beyond the starter actuation, the relay 27 can be equipped with a time delay by which the switch 24 is not opened again immediately after the end of the starting process, but rather opens again only after a certain period of time. This time delay can be adjusted by selecting suitable values of inductance of the relay coil 27 and of capacitance of the capacitor 29. The additional diode 28 is to prevent the capacitor 29 from being discharged again via the starter relay 13, 14 after the end starting process.

The maximum value of the additional exciting current supplied by the battery can be determined by the resistor 25. The diode 26 decouples the generator output 17 from the positive pole of the battery.

Since the pre-excitation is effected by the additional line or current branch 41 via the component parts 24, 25 and 26, the charge control light can be selected as desired. Thus, it requires no special power consumption, so that e.g. a high-resistance charge control light can be used or a light emitting diode can be used instead of the charge control light. A reliable pre-excitation of the generator is ensured via the additional line even if the charge control light is defective.

The generator and the starter, in their entirety, are enclosed by a housing 51. The component elements which are connected by means of the additional line between the battery 15 and the starter arrangement 11, 12, 13, 14 can be installed in the housing of the generator or in the housing of the starter motor.

Figure 2:
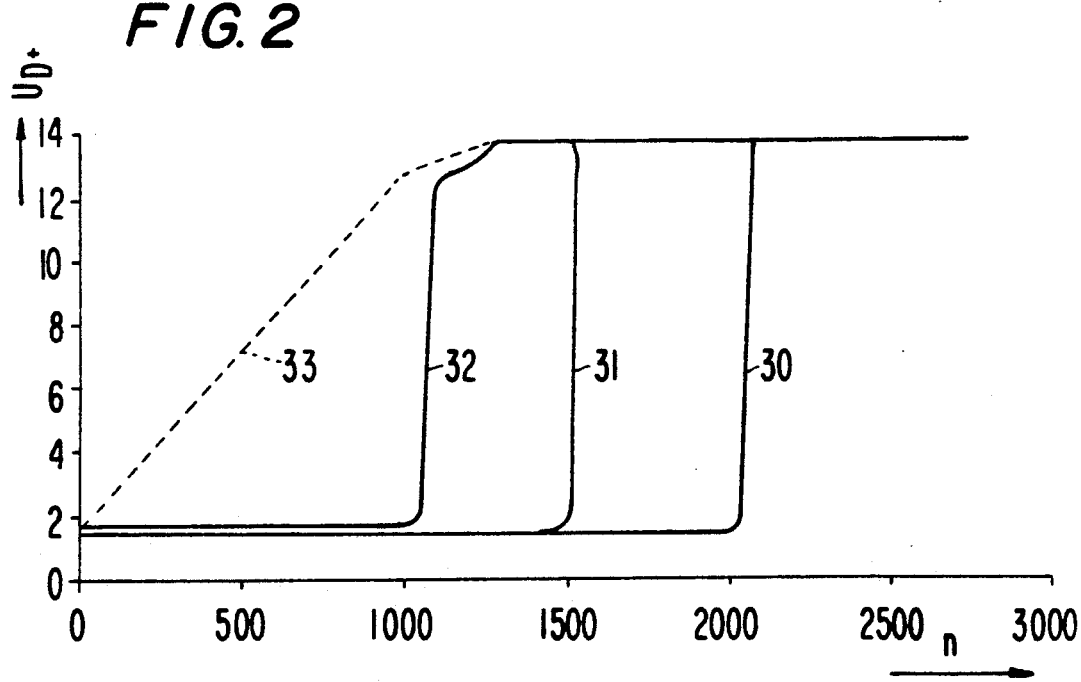
FIG. 2 is a graphical illustration of the relationship between generator output voltage and the generator speed in revolutions per minute for the arrangement shown in FIG. 1.

FIG. 2 shows the starting behavior of a K1-14 V/23/65A generator with various possibilities for pre-excitation. The generator output voltage in volts is plotted over the generator revolutions per minute.

Curve 30 shows the configuration of the generator voltage over the generator speed when starting the generator with a pre-excitation exclusively via a charge control light with 1.2 watt power consumption. Curves 31 and 32 show the same thing for charge control lights with 2.0 watts and 3.0 watts power consumption.

Curve 33 shows the configuration of the generator voltage over the generator speed with the use of a 1.2 watt charge control light and an added excitation or auxiliary excitation, according to the embodiment example according to FIG. 1, in a schematic manner. It is clear that the generator output voltage with added excitation increases already at very low speeds and reaches its desired maximum value substantially sooner than without excitation. The starting speed of the generator is thus clearly reduced by the added excitation.

It will be understood that each of the elements described above, or two or more together, may also find a useful application in other types of structures differing from the types described above.

While the invention has been illustrated and described as embodied in an apparatus for charging a battery or battery charging device, especially in a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. In an apparatus for charging a battery, particularly in a motor vehicle driven by an internal combustion engine, said arrangement comprising a self-exciting generator having an exciting winding through which an exciting current can pass and a generator output, a regulator connected in series to the exciting winding of the generator for regulating the exciting current in the exciting winding; a starter arrangement comprising a starter motor for starting the internal combustion engine and a starter relay including a starter relay coil and a starter relay switch for switching on the starter motor; a battery having two terminals, one of said terminals being connected to ground together with the generator output and the other of said terminals being connected to a supply line; and an ignition/starter switch also connected to the supply line, said ignition/starter switch having an initial position, an operating position and a starting position and also an operating contact and a starting contact and said ignition/starter witch being structured and electrically connected with said battery, with consuming devices and with said starter arrangement, so that no current flows through sad ignition/starter switch in the initial position of the ignition/starter switch, current flows through the operating contact and the consuming devices when said ignition/starter switch is in the operating position and current flows through the starter arrangement including the starter motor and consuming devices when the ignition/starter switch is in the starting position; and a first current branch including the operating contact of the ignition/starter switch, said first current branch being connected to the exciting winding of the generator, the improvement comprising an additional relay, said additional relay including an additional relay coil (27) and additional relay switch (24), and an additional current branch (41) including the additional relay, said additional current branch (41) electrically connecting the battery (15) and the exciting winding (18) of the generator (16) through the additional relay switch (24) when the additional relay (14,27) is actuated by current flowing through the additional relay coil (27).

2. The improvement as defined in claim 1, further comprising at least one diode (26) and wherein the at least one diode (26) is located in the additional current branch (41).

3. The improvement as defined in claim 1, further comprising at least one ohmic resistor (25) and the at least one ohmic resistor (25) is located in the additional current branch (41).

4. The improvement as defined in claim 3, further comprising a diode (26), and wherein the additional current branch (41) contains the diode (26) and one of the ohmic resistors (25) and the ohmic resistor is connected in series with the diode (26) in the additional current branch (41).

5. The improvement as defined in claim 1, wherein the additional relay coil (27) is connected with the ignition/starter switch so that the additional relay is energized by setting the ignition/starter switch in the starting position causing current flow in the additional relay coil (27).

6. The improvement as defined in claim 1, wherein the additional relay is connected with the starter arrangement so that the additional relay is energized by operation of the starter arrangement (11 to 14).

7. In an apparatus for charging a battery, particularly in a motor vehicle driven by an internal combustion engine, said arrangement comprising a self-exciting generator (16) having an exciting winding (18) and a generator output (17), a regulator (19) connected in series to the exciting winding (18) of the generator (16) for regulating an exciting current of the exciting winding (18), a starter arrangement (11-14) comprising a starter motor (11) for starting the internal combustion engine and a starter relay including a starter relay coil and a starter relay switch for switching on the starter motor (11), a battery (15) having two terminals, one of said terminals being connected to ground together with the generator output (17) and the other of said terminals being connected to a supply line, and an ignition/starter switch also connected to the supply line, said ignition/starter switch having an initial position, an operating position and a starting position and an operating contact made in said operating position and a starting contact made in said starting position, and said ignition/starter switch being structured and connected with said battery (15), with consuming devices and said starting arrangement, so that no contact is made in the initial position of the ignition/starter switch, current flows through the operating contact and the consuming devices when said ignition/starter switch is in the operating position of the ignition/starter switch, and the starter arrangement and consuming devices are switched on when the ignition/starter switch is in the starting position/ and a first current branch including the operating contact and connected to the exciting winding of the generator, the improvement comprising an additional relay, said additional relay including an additional relay coil and an additional relay switch, and an additional current branch including the additional relay, said additional current branch electrically connecting the battery and the exciting winding of the generator through the additional relay switch when the additional relay is actuated by current passing through the additional relay coil, and a time delay means connected with the additional relay (27).

8. The improvement as defined in claim 7, wherein the time delay means comprises a capacitor (29) connected in parallel to the additional relay coil (27).

9. The improvement as defined in claim 8, further comprising an additional diode (28) having a cathode and an anode, and wherein the anode of the additional diode (28) is connected to the starter relay coil (27) and the starting contact of the ignition/starter switch (21) and the cathode of the additional diode (28) is connected electrically to the additional relay coil (27).

10. The improvement as defined in claim 1, further comprising a capacitor (29) connected in parallel to the additional relay (24,27) so that the capacitor (29) acts as a time delay means for the additional relay (24,27), and an additional diode (28) having an anode and a cathode, the cathode of the additional diode (28) being connected to the additional relay (24,27) and the anode of the additional diode (28) being connected to the starter relay coil (14) and the ignition/starter switch (21).

11. The improvement according to claim 1, further comprising a housing (51) at least enclosing the generator (16) and the starter arrangement (11–14), and wherein said additional current branch (41) contains a plurality of component elements including an additional relay (24,27), an ohmic resistor (25) and a diode (26) connected electrically in series, said diode (26) being connected to the exciting winding (18) of the generator (16), as well as a capacitor (29) connected in parallel across the additional relay coil (27), and said component elements also being in said housing (51).

* * * * *